United States Patent [19]
Greis

[11] 3,938,811
[45] Feb. 17, 1976

[54] SEALING MEANS FOR STIRLING ENGINE CRANKCASES

[75] Inventor: Ingemar Joel Greis, Dalby, Sweden

[73] Assignee: Kommanditbolaget United Stirling (Sweden) AB & Co., Malmo, Sweden

[22] Filed: Oct. 11, 1974

[21] Appl. No.: 514,210

[52] U.S. Cl. ..................... 277/15; 277/19; 277/67
[51] Int. Cl.² ......................................... F16J 15/00
[58] Field of Search ............... 277/18, 17, 15, 3, 19, 277/67; 60/517

[56] References Cited
UNITED STATES PATENTS

| | | |
|---|---|---|
| 2,244,450 | 6/1941 | Erni ........................................ 277/3 |
| 2,505,868 | 5/1950 | Murphy .................................. 277/18 |
| 3,746,350 | 7/1973 | Mayer .................................... 277/15 |
| 3,848,877 | 11/1974 | Bengtsson ............................... 277/3 |

Primary Examiner—Samuel B. Rothberg
Attorney, Agent, or Firm—Laurence R. Brown

[57] ABSTRACT

A rotatable crankshaft extends from a crankcase and is sealed for leakage of gas under pressure by an oil chamber surrounding the crankshaft wherein the oil therein is rotated in the direction of crankshaft rotation and is supplied from an oil sump of the crank casing by a conduit with a one-way flow valve into the chamber.

4 Claims, 1 Drawing Figure

U.S. Patent  Feb. 17, 1976  3,938,811
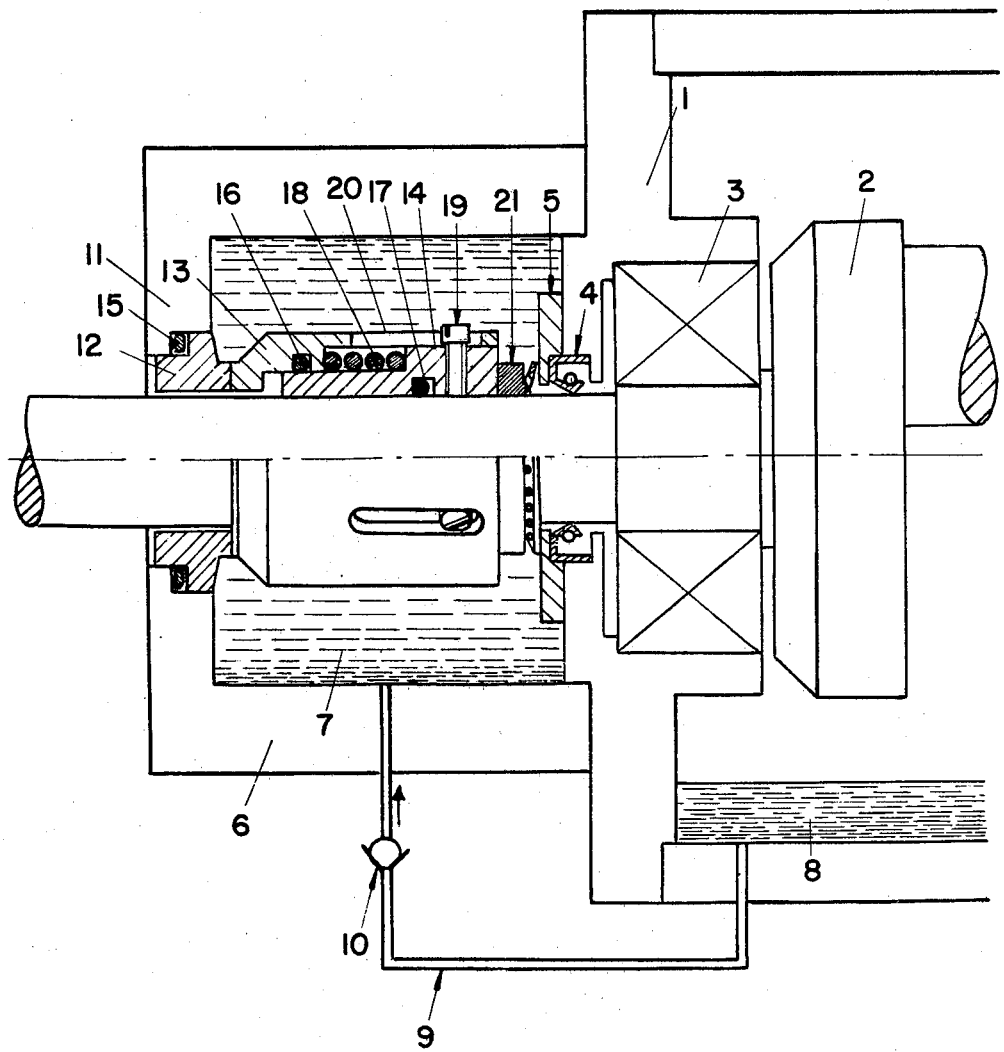

SEALING MEANS FOR STIRLING ENGINE CRANKCASES

This invention relates to a sealing device for preventing leakage of gas through a crank casing wall along a crank shaft extending therethrough, said crank casing containing gas at a cyclically varying elevated pressure.

Crank casings containing gas at a cyclically varying elevated pressure may be found in small hot gas engines required to work during long intervals between services, and it is of great importance that no gas or very little gas will leak from such engines.

It is well known that in hot gas engines it is easier to seal against leakage of oil than of gas. Therefore it is an object of the invention to provide an oil seal which practically may substitute a conventional gas seal.

According to the invention there is provided a sealing device for preventing leakage of gas through a crank casing wall along a crank shaft extending therethrough, said crank casing containing gas at a cyclically varying elevated pressure, characterised in that an oil-containing chamber is arranged at the outside of said crank casing and surrounding the said crank shaft, and that a conduit connects an oil sump of said crank casing with said chamber, a non-return valve being arranged in said conduit allowing flow of oil only in the direction from said sump to said chamber, means being provided for causing rotation of the oil in said chamber in the direction of rotation of said crank shaft.

How the invention may be put into practice is described in more detail with reference to the accompanying drawing showing a sealing device according to the invention partly in axial section.

The drawing shows a wall 1 of a crank casing containing a crank shaft 2 which is journalled in a ball bearing 3 and extends through an opening in said wall 1. An elastically deformable radial shaft seal 4 retained by a ring 5 provides a one-way seal between the stationary wall 1 and the surface of the crank shaft 2, as further described below.

A housing 6 limiting a chamber 7 is secured to the wall 1 surrounding the passage of the crank shaft 2 through the opening in the wall 1.

The chamber 7 is filled with oil and is connected to an oil sump 8 in the crank casing through a conduit 9 containing a non-return valve 10 allowing flow of oil only in the direction towards the chamber 7. The radial shaft seal 4 is designed to allow flow of oil only in the direction from the chamber 7 to the bearing 3.

The crank shaft 2 extends through an opening in an opening in an end wall 11 of the housing 6. A sealing device of known type comprising a stationary element 12 and a rotating element 13 prevents leakage of oil from the chamber 7. The rotating element 13 is a sleeve mounted to be telescopically displaceable on another sleeve 14 rigidly connected to the shaft 2. O-rings 15, 16 and 17 constitute stationary seals. A spring 18 ensures that the sealing elements 12 and 13 are in engagement with each other even in the event of wear of the contacting surfaces. A screw 19 secured to the element 14 and protruding into a slot 20 in the element 13 connects the elements 13 and 14 so as to prevent any relative rotation while allowing relative movements in the axial direction.

A perforated rubber ring 21 is mounted on the crank shaft 2 for rotation therewith.

The device described will operate as follows:

The crank casing limited by the wall 1 contains working gas at a high cyclically varying pressure. During periods of maximum pressure oil is pumped through the conduit 9 containing the non-return valve 10 into the chamber 7.

During periods in which the oil pressure in the chamber 7 exceeds the pressure of the working gas in the crank casing oil will start to leak along the crank shaft 2 and through the one-way radial shaft seal 4 in the direction towards the crank casing. Owing to the flow of oil in this direction no gas will leak into the chamber 7.

During periods when the engine is not in operation some gas may leak into the chamber 7 and accumulate at the top thereof. However, as soon as the engine is started the oil in the chamber 7 will be caused to rotate by the radially extending surfaces bounding the slot 20. The slot 20 extends in the axial direction, and generally three such slots will be arranged, although only two are shown in the drawing.

The perforated rubber ring 21 will contribute to cause rotation of the oil within the chamber 7.

Thus the slotted element 13 and the perforated ring 21 are included in means for causing rotation of the oil in the chamber 7 in the direction of rotation of the crank shaft 2.

Due to the centrifugal force acting upon the oil in the chamber 7 the gas contained therein will now accumulate near the crank shaft 2 and will leak back through the radial shaft seal 4 into the crank casing when the pressure in the chamber 7 exceeds the pressure in the crank casing.

What we claim is:

1. A sealing device for preventing leakage of gas through a crank casing wall along a rotatable crank shaft extending therethrough, said crank casing containing gas at a cyclically varying elevated pressure, characterised in that an oil-containing chamber is arranged on the outside of said crank casing wall and surrounding the said crank shaft, said crank casing has an oil sump within said wall, a conduit connects said oil sump of said crank casing with said chamber, a non-return valve being arranged in said conduit allowing flow of oil only in the direction from said sump to said chamber, a one way sealing member about said shaft and located between the shaft and said wall to permit flow of oil in the direction from said chamber into said crank casing, and rotation means being provided for causing rotation of the oil in said chamber in the direction of rotation of said crank shaft.

2. A sealing device according to claim 1, wherein said rotation means includes a rotating element connected to the crank shaft.

3. A sealing device according to claim 2, wherein said rotating element is in the form of a sleeve provided with slots extending in the axial direction of said shaft.

4. A sealing device according to claim 2 wherein said means includes a perforated ring mounted on the crank shaft for rotation therewith.

* * * * *